United States Patent [19]

Spötzl et al.

[11] Patent Number: 5,474,134
[45] Date of Patent: Dec. 12, 1995

[54] SYSTEM FOR MAKING A MOLDED LAMINATE

[75] Inventors: Markus Spötzl, Munich; Erwin Bürkle, Bichl; Konrad Zweig, Augsburg, all of Germany

[73] Assignee: Krauss-Maffei AG, Munich, Germany

[21] Appl. No.: 428,266

[22] Filed: Apr. 25, 1995

Related U.S. Application Data

[60] Continuation of Ser. No. 185,326, Jan. 21, 1994, abandoned, which is a division of Ser. No. 820,095, Jan. 13, 1992, abandoned.

[30] Foreign Application Priority Data

Jan. 16, 1991 [DE] Germany .......................... 41 01 106.6

[51] Int. Cl.⁶ ............................ B32B 31/04; B29C 51/02
[52] U.S. Cl. .................. 156/475; 156/214; 156/245; 156/500; 156/581; 425/348 R; 425/576
[58] Field of Search ..................... 156/500, 245, 156/475, 214, 580, 581; 425/348 R, 453, 576, 454; 264/255, 40.1, 259, 266, 267, 271.1, 279

[56] References Cited

U.S. PATENT DOCUMENTS

| | | | |
|---|---|---|---|
| 4,439,123 | 3/1984 | Sano et al. | 425/112 |
| 4,501,714 | 2/1985 | Strobel et al. | |
| 4,664,460 | 5/1987 | Ongena | 264/40.1 |
| 4,691,500 | 9/1987 | Danforth et al. | 156/69 |
| 4,873,045 | 10/1989 | Fujita et al. | |

FOREIGN PATENT DOCUMENTS

| | | |
|---|---|---|
| 263346 | 7/1968 | Australia . |
| 1236177 | 3/1967 | Germany . |
| 1729629 | 7/1971 | Germany . |
| 3141410 | 6/1982 | Germany . |
| 3144084 | 6/1983 | Germany . |
| 1339712 | 12/1973 | United Kingdom . |
| 2206835 | 1/1989 | United Kingdom . |

OTHER PUBLICATIONS

Vol. 13, No. 193 (M–822 (3541), May 9, 1989.
"Spritzprägen Dünnwendiger Thermoplastischer Formteile" (Friesenbichler et al., (Kunststoffe 80(1990)5, Karl–Hauser Verlag, Munich 1990).
"Zweifarben–Spritzgiessen" (Brochure issued by Arbupg Maschinenfabrik Hehl & Söhne, 7298 Lossburg/Schwarzwald, Germany).

*Primary Examiner*—Michele K. Yoder
*Attorney, Agent, or Firm*—Herbert Dubno; Andrew Wilford

[57] ABSTRACT

A laminate is made by first forming a substantially closed mold cavity between a pair of mold halves, then injecting a plastified synthetic resin into the cavity under pressure to substantially fill the cavity and at least partially curing the resin in the cavity to form a base body. The mold halves are then separated to leave the partially cured body in one of the mold halves with a face of the body exposed and a deformable sheet is laid over the face of the body in the one mold half. A die having a face conforming at least generally to the shape of the body face is then laid down against the sheet onto the body to press the sheet into intimate contact with the body face and bond the sheet and body together.

1 Claim, 3 Drawing Sheets

SYSTEM FOR MAKING A MOLDED LAMINATE

This is a continuation of Ser. No. 08/185,326 filed on 21 Jan. 1994, (now abandoned), which is a division of Ser. No. 07/820,095 filed 13 Jan. 1992 (now abandoned).

FIELD OF THE INVENTION

The present invention relates to a method of making a laminated article. More particularly this invention concerns a method of and apparatus for producing a laminated article at least partially of a thermoplastic synthetic resin.

BACKGROUND OF THE INVENTION

It is frequently necessary to laminate together different materials to form complexly shaped articles of manufacture. For instance interior body parts constituting, for instance, the dashboard or door panels of an automotive vehicle have an outer skin layer formed by a durable leatherlike foil, an intermediate layer of a soft foam, and an inner skin.

As described in U.S. Pat. No. 4,873,045 of Fujita (British equivalent 2,206,835 published 15 Jan. 1989) this can be done by extruding a layer of synthetic-resin foam and depositing it immediately on a lower die half. A two-part laminate having the outer skin and an intermediate blocking layer is secured to the lower surface of an upper die half which is then pressed down over the foam layer on the lower die. This deforms both the foam layer to conform to the upper face of the lower die and the upper laminate to conform to the lower face of the upper die, simultaneously bonding the two layers together.

Such a process does not allow the lower surface of the base body to be highly contoured. In addition the base body must be of substantially uniform thickness. Thus it is impossible to provide integral attachment rivets or the like on the base body. Furthermore this arrangement frequently presses the base body in many locations, in particular where it is formed with a high bump or low recess, to excessive thinness, leaving the finished article less cushioned in these regions.

It is also known, for example from U.S. Pat. No. 4,501,714 of Strobel and European patent 197,496 of Ongena (based on U.S. Ser. No. 07/718,913) to put decorative foils or the like on one surface of a mold so that when the mold is closed this decoration will be integrally bonded to the material with which the mold is filled. Such a procedure can only be used for limited surface decoration and is fairly complex.

PCT application 83/02747 (based on U.S. Ser. No. 07/345,938) describes a coextrusion method where a laminate foil is subsequently separated into several parts between the layers. Another laminate extrusion system is described in German 3,141,410 of Troedsson. Various extrusion/molding systems are further described in German patent 3,144,084 of Oelsch, German patent document 1,729,629 filed 27 Sep. 1967, and in Austrian patent 263,346 of Hey. The in-house publication "Zweifarben-Spritzgießen" (Two-color injection molding) of ARBUPG describes a system for coinjection-molding two resins of different colors. None of these arrangements allows a highly contoured base element to be laminated with a uniform-thickness skin.

OBJECTS OF THE INVENTION

It is therefore an object of the present invention to provide an improved system for forming a shaped laminate.

Another object is the provision of such an improved system for forming a shaped laminate which overcomes the above-given disadvantages, that is which allows a base body to be formed with a complex shape and nonuniform thickness and to be laminated with another layer into a integral piece.

SUMMARY OF THE INVENTION

A laminate is made according to the invention by first forming a substantially closed mold cavity between a pair of mold halves, then injecting a plastified synthetic resin into the cavity under pressure to substantially fill the cavity and at least partially curing the resin in the cavity to form a base body. The mold halves are then separated to leave the partially cured body in one of the mold halves with a face of the body exposed and a deformable sheet is laid over the face of the body in the one mold half. A die having a face conforming at least generally to the shape of the body face is then laid down against the sheet onto the body to press the sheet into intimate contact with the body face and bond the sheet and body together.

With this system it is therefore possible to form the body of nonuniform thickness with a lower surface that can bear no resemblance to the shape of its upper surface, and then to bond a cover sheet solidly to the upper surface. There are no constraints on the wall thickness at any location or any other shape feature of the lower surface of the body so that a very complex article can be manufactured. Since the same mold half is used both for the original forming of the base body and for the subsequent lamination, extremely fine surface detail can be done on the lower surface of the base body.

According to a further feature of this invention the surface of the other mold half is treated or the mold halves are so constructed that the body does not stick to the other mold half, which is normally above the one mold half. In addition during the injection step and at the start of the curing step the two mold halves are spaced apart by a predetermined distance and during the curing step the two mold halves are pressed together to reduce the spacing between them. This type of injection/press molding can produce an article of great detail and very small wall thickness.

The apparatus of this invention can have a support carrying a pair of such one mold halves movable between one position with one of the one mold halves positioned in an injection station and the other of the one mold halves in a laminating station and another position with the other of the one mold halves in the injection station and the one of the one mold halves in the laminating station. The other mold half is vertically displaceable in the injection station and the die is vertically displaceable in the laminating station.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
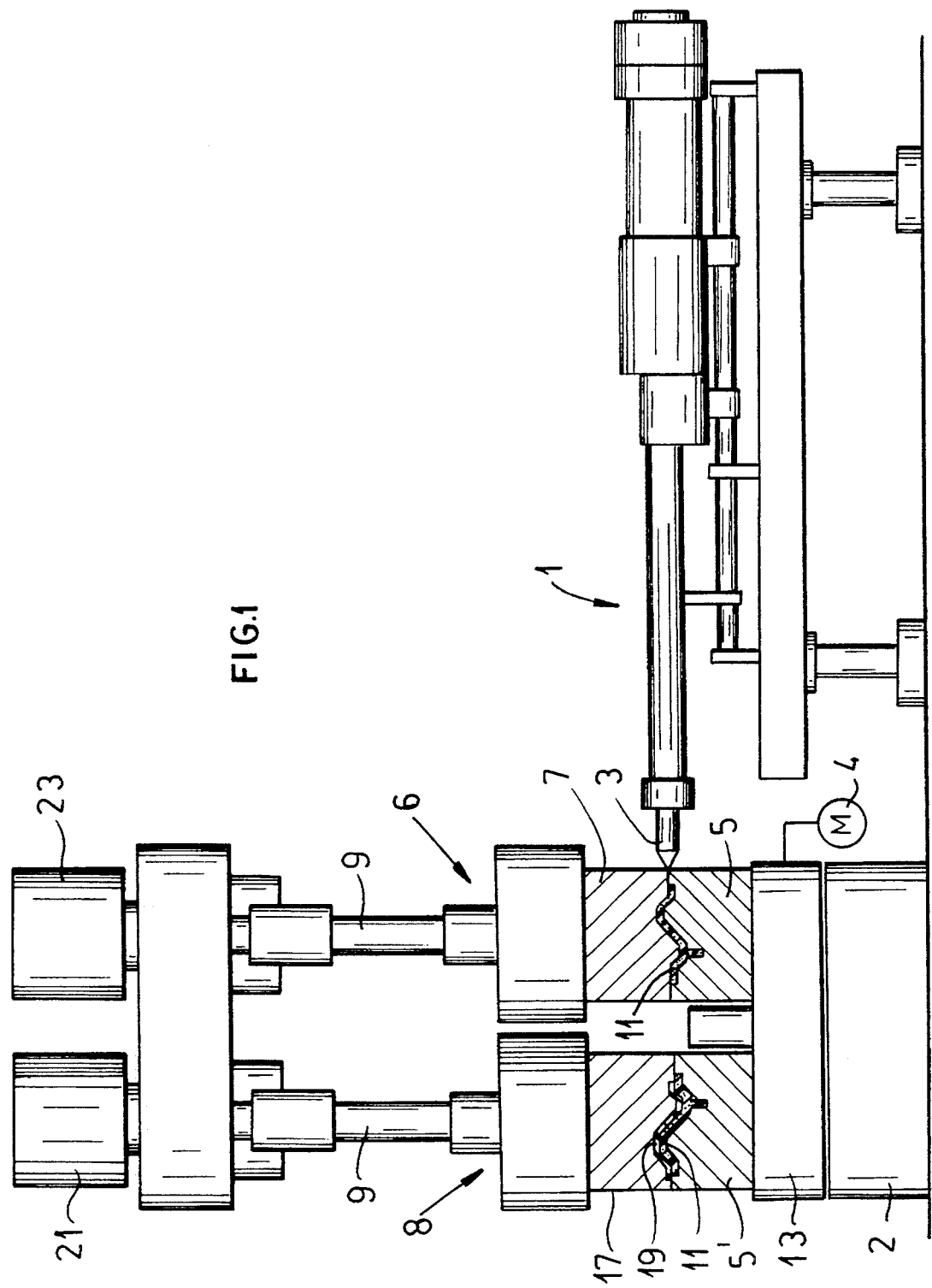
FIG. 1 is a diagrammatic side view partly in vertical section through the apparatus of the system of this invention in the injecting and laminating position.
Figure 2:
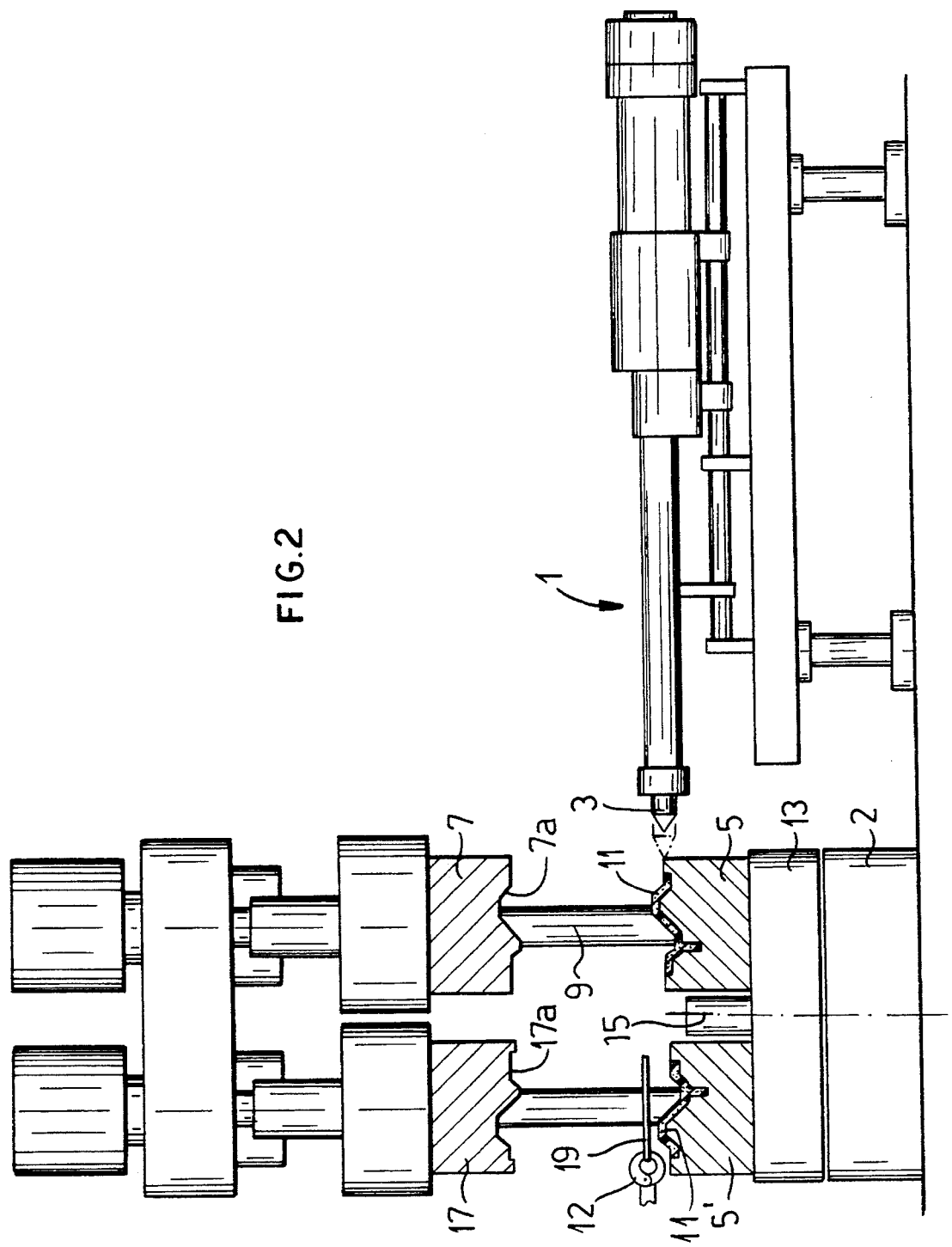
FIG. 2 is a view like FIG. 1 but of the machine in the transfer/loading position.
Figure 3:
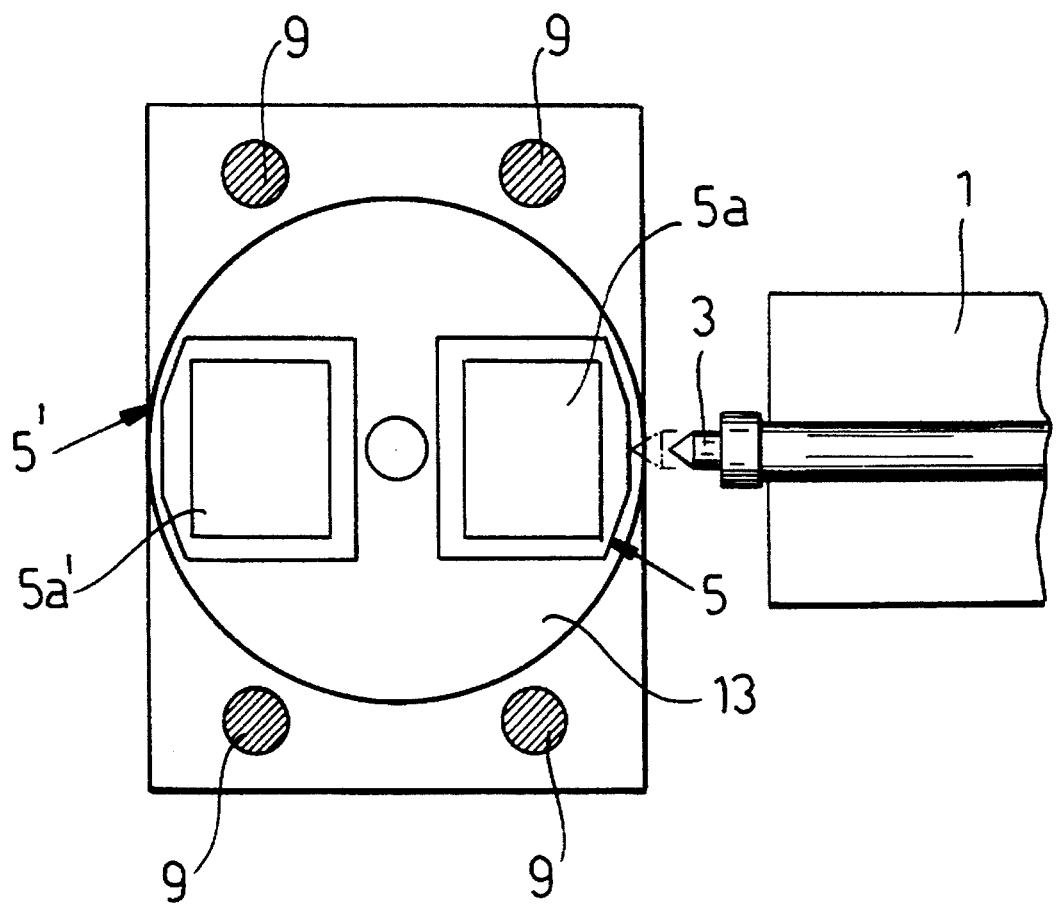
FIG. 3 is a horizontal section through the apparatus of this invention.

An extruding machine 1 has a head 3 which can be extended as seen in FIG. 1 or retracted as seen in FIG. 2. This machine can extrude a stream of a thermoplastic synthetic resin under high pressure. A support or base 2 carries a turntable 13 rotatable about an upright axis 15 and in turn carrying a pair of identical lower mold halves 5 and 5' each having a highly contoured upper surface 5a and 5a'. The turntable 13 can be rotated in 180° steps by a motor illustrated diagrammatically at 4 for moving the lower mold halves 5 and 5' alternately through diametrically opposite injecting and laminating stations 6 and 8.

A pair of columns 9 carry an upper mold half 7 in the station 6 that is vertically reciprocal by an actuator 23. This mold half 7 has a lower surface 7a capable of forming a closed mold cavity with the upper surface 5a or 5a' of the underlying mold half 5 or 5'. The surfaces 7a and 5a (or 5a') are not complementary or parallel to each other so that as illustrated a workpiece 11 can be formed that is not of uniform wall thickness.

Another pair of columns 9 supports another mold half or die 17 in the station 8 for vertical movement by its own actuator 21. This die 17 has a lower surface 17a that is of the same shape as the lower surface 7a. A manipulator shown diagrammatically at 12 in FIG. 2 can insert a cover sheet 19 underneath the die 17 when same is raised.

The system described above operates as follows:

To start with at least the upper mold half 7 is set down on the lower half 5 to form therewith a closed mold cavity. Normally the two halves 5 and 7 are positioned to start with at a slightly greater vertical spacing than that corresponding to a tight fit between them, although even in this slightly wide position they still form a closed mold cavity.

The extruder tip or head 3 is then extended to fit into an unillustrated fill passage which might be formed between the two halves 5 and 7 or only in the lower half 5, and a hot plastified synthetic resin is injected under pressure into the cavity. During curing of the resin the upper half 5 is pushed all the way down as described in the article "Spritzprägen dünnwandiger thermoplastischer Formteile" (Injection stamping of thin-walled thermoplastic molded parts) by W. Knapp (from Maschinen, Geräte, Verarbeitung of Carl Hanser Verlag, Munich 1990) to press the workpiece and cause it to perfectly assume the shape of the cavity while being made very thin.

Once the body 11 is at least partially cured the mold 5, 7 is opened. The body 11 remains in the lower half because the upper half is made of a material like carbon or is coated with a material like silicone oil to readily release. Alternately the lower-mold cavity may be undercut or provided with vacuum suckers to retain the body 11 in place.

In any case the turntable 13 is then rotated through 180° to shift the body 11 to the laminating station 8 where the manipulator 12 positions a cover sheet 19 atop this body 11. The die 17 is then pressed down to heat and bond the sheet 19 to the top surface of the body 11. During this step another body 11 is formed in the mold in the injection station 6.

We claim:

1. A system for making a laminate, the system comprising:

a turntable rotatable about an upright axis;

a pair of identical mold lower halves having upper faces and fixed diametrally opposite each other on the turntable;

an upper mold half vertically displaceable above the turntable in an injecting station to one side of the axis and having a lower face capable of forming with each of the upper faces a substantially closed mold cavity;

extrusion means in the injecting station for injecting a plastified synthetic resin into the cavity under pressure to substantially fill the cavity, whereby the resin is at least partially cured in the cavity to form a base body;

means for separating the upper mold half from the mold halves and leaving the partially cured body in one of the lower mold halves with a face of the body exposed;

means in a laminating station adjacent the injecting station to an opposite diametral side of the axis for laying a deformable sheet over the face of the body in the one mold half;

a laminating die vertically displaceable in the laminating station to the opposite diametral side of the axis and having a face conforming at least generally to the shape of the body face;

means for pressing the laminating die down against the sheet onto the body and thereby pressing the sheet into intimate contact with the body face and bonding the sheet and body together; and means for pivoting the turntable and both lower mold halves between one position with one of the lower mold halves positioned in the injecting station and the other of the lower mold halves in the laminating station and another position with the other of the lower mold halves in the injecting station and the one of the lower mold halves in the laminating station.

\* \* \* \* \*